United States Patent [19]

Eccles

[11] Patent Number: 5,487,645
[45] Date of Patent: Jan. 30, 1996

[54] RAM AIR TURBINE WITH SECONDARY GOVENOR

[75] Inventor: Steven R. Eccles, Torrance, Calif.

[73] Assignee: AlliedSignal Inc., Morris Township, N.J.

[21] Appl. No.: 341,718

[22] Filed: Nov. 18, 1994

[51] Int. Cl.[6] .................................................... F01D 7/02
[52] U.S. Cl. ................... 416/51; 416/50; 416/52; 416/53
[58] Field of Search ................... 416/50, 51, 52, 416/53

[56] References Cited

U.S. PATENT DOCUMENTS

| | | | |
|---|---|---|---|
| 2,382,229 | 8/1945 | Humphreys | 416/52 |
| 2,876,847 | 3/1959 | Blackburn et al. | 416/52 |
| 4,411,596 | 10/1983 | Chilman | 416/51 |
| 4,743,163 | 5/1988 | Markunas et al. | 416/44 |
| 5,249,924 | 10/1993 | Brum | 416/48 |

Primary Examiner—Edward K. Look
Assistant Examiner—Michael S. Lee
Attorney, Agent, or Firm—James W. McFarland

[57] ABSTRACT

A ram air turbine is provided for use in driving electric and/or hydraulic power systems in an aircraft, wherein the ram air turbine includes primary and secondary speed control governors. The primary governor includes centrifugal flyweights for cam-actuated adjustment of the pitch angle of a turbine blade or blades, within a selected adjustment range, to achieve substantially constant turbine speed in response to varying air speed and/or load. The secondary governor preloads the turbine blade or blades to a selected midrange pitch angle in the at-rest condition, wherein the midrange pitch angle is chosen for faster turbine acceleration on deployment to the desired full-speed rotation. The secondary governor controls blade pitch angle until the turbine reaches a selected rotational speed, after which the primary governor regulates and adjusts blade pitch angle within the selected adjustment range.

13 Claims, 6 Drawing Sheets

RAM AIR TURBINE WITH SECONDARY GOVENOR

BACKGROUND OF THE INVENTION

This invention relates generally to ram air turbines of the type used on an aircraft to drive backup electric and/or hydraulic power systems. More specifically, this invention relates to an improved ram air turbine having a secondary speed control governor for regulating turbine blade pitch angle in a manner achieving faster turbine acceleration on deployment.

Ram air turbines are generally known in the aerospace industry for use in driving auxiliary power systems in the event of a primary system failure. The ram air turbine is commonly stored within the wing or fuselage of an aircraft for deployment into the air stream when needed. The turbine includes two or more turbine blades adapted to be driven by the air stream, to provide a rotary output which can be used to drive an electrical generator and/or a hydraulic pump. Such ram air turbines are commonly equipped with a speed control governor for altering turbine blade pitch angle to achieve a substantially constant turbine rotational speed despite variations in air speed and/or load.

Since the ram air turbine is a key part of an emergency backup power system for the aircraft, turbine deployment normally does not occur unless and until a primary power system failure is encountered. When such failure occurs, it is extremely desirable for the ram air turbine to be deployed and accelerated to operational speed as quickly as possible. In this regard, speed control governors for regulating turbine speed after initial acceleration can be incompatible with optimizing turbine speed run-up upon initial turbine deployment. That is, speed control governors for ram air turbines generally function by setting the blade pitch angle in the at-rest condition at an angle which does not achieve the desired optimized rapid acceleration from the at-rest condition to the design operating speed.

The present invention provides an improved ram air turbine for use in an aircraft environment, wherein the ram air turbine includes a primary governor for speed control during normal operating conditions, in combination with a secondary governor which sets the turbine blade pitch angle in the at-rest condition for substantially optimized and rapid turbine acceleration on initial deployment.

SUMMARY OF THE INVENTION

In accordance with the invention, an improved ram air turbine is provided for driving auxiliary power systems in an aircraft. The ram air turbine includes a primary governor including centrifugal means for varying turbine blade pitch angle within a selected adjustment range during normal operation to maintain substantially constant turbine output speed in response to varying air speed and/or load. The improved ram air turbine additionally includes a secondary governor for setting turbine blade pitch angle at a selected midrange position in the at-rest condition, wherein the selected midrange pitch angle position is chosen for achieving faster turbine acceleration on initial deployment. As turbine speed increases on initial acceleration, the secondary governor is deactivated to permit speed control to be regulated by the primary governor.

In the preferred form of the invention, the ram air turbine includes an output shaft rotatably supported within a suitable housing and connected to an auxiliary power unit such as an electrical generator and/or an hydraulic pump. The output shaft carries a rotary hub having at least two turbine blades radiating outwardly therefrom. The turbine blades are supported on the hub in a manner permitting rotational blade movement to adjust blade pitch angle.

The primary governor comprise one or more centrifugal primary flyweights carried within the hub and biased in the at-rest condition toward radially inward positions. Hub rotation as the blades are driven by the surrounding air stream causes the primary flyweights to displace in radially outward directions. The primary flyweights include cam followers for engaging a contoured cam lever which acts through a face gear to adjust turbine blade pitch angle within a selected adjustment range. In a typical configuration, the primary governor adjusts pitch angle from a low or coarse position for maximum power transfer to a high or fine pitch angle for minimum power transfer. A typical range of coarse to fine adjustment is approximately 5 degrees to about 60 degrees, with the pitch angle modulating near the high end of the range during full-speed rotation to maintain turbine output speed substantially constant.

The secondary governor preloads the face gear to alter the blade pitch angle to the selected midrange pitch angle position in the at-rest condition. In this regard, in the preferred form, the secondary governor includes one or more spring loaded preload levers for engaging and rotating the face gear in a direction adjusting the blade pitch angle to the midrange position. The face gear correspondingly engages and rotates a pair of centrifugal secondary flyweights to radially inward positions. Importantly, in the at-rest condition, the midrange blade pitch angle is selected for substantially optimum and rapid turbine acceleration from zero to a substantial rotational speed. In the preferred form, the midrange pitch angle is approximately 15 degrees and is retained until the turbine output speed exceeds approximately 2,000 rpm.

On initial deployment of the ram air turbine, as the turbine is accelerated with the blade pitch angle at the midrange position, the secondary flyweights apply a centrifugal force to the face gear. That force increases as a direct function of turbine speed, and eventually exceeds the preload force applied by the preload levers to result in shifting of the face gear back to the coarse pitch angle position at the low end of the pitch angle adjustment range. When this shift occurs, the secondary governor is effectively locked against the primary governor, and thus is removed from system control. Thereafter, blade pitch angle for speed control is regulated by the primary governor within the entire range of pitch angle adjustment as long as the rotational turbine speed is maintained above the shift point with the secondary flyweights applying a force in excess of the preload force.

Other features and advantages of the present invention will become more apparent from the following detailed description, taken in conjunction with the accompanying drawings which illustrate, by way of example, the principles of the invention.

DETAILED DESCRIPTION OF THE DRAWINGS

The accompanying drawings illustrate the invention. In such drawings.

DETAILED DESCRIPTION OF THE PREFERRED EMBODIMENT

Figure 1:
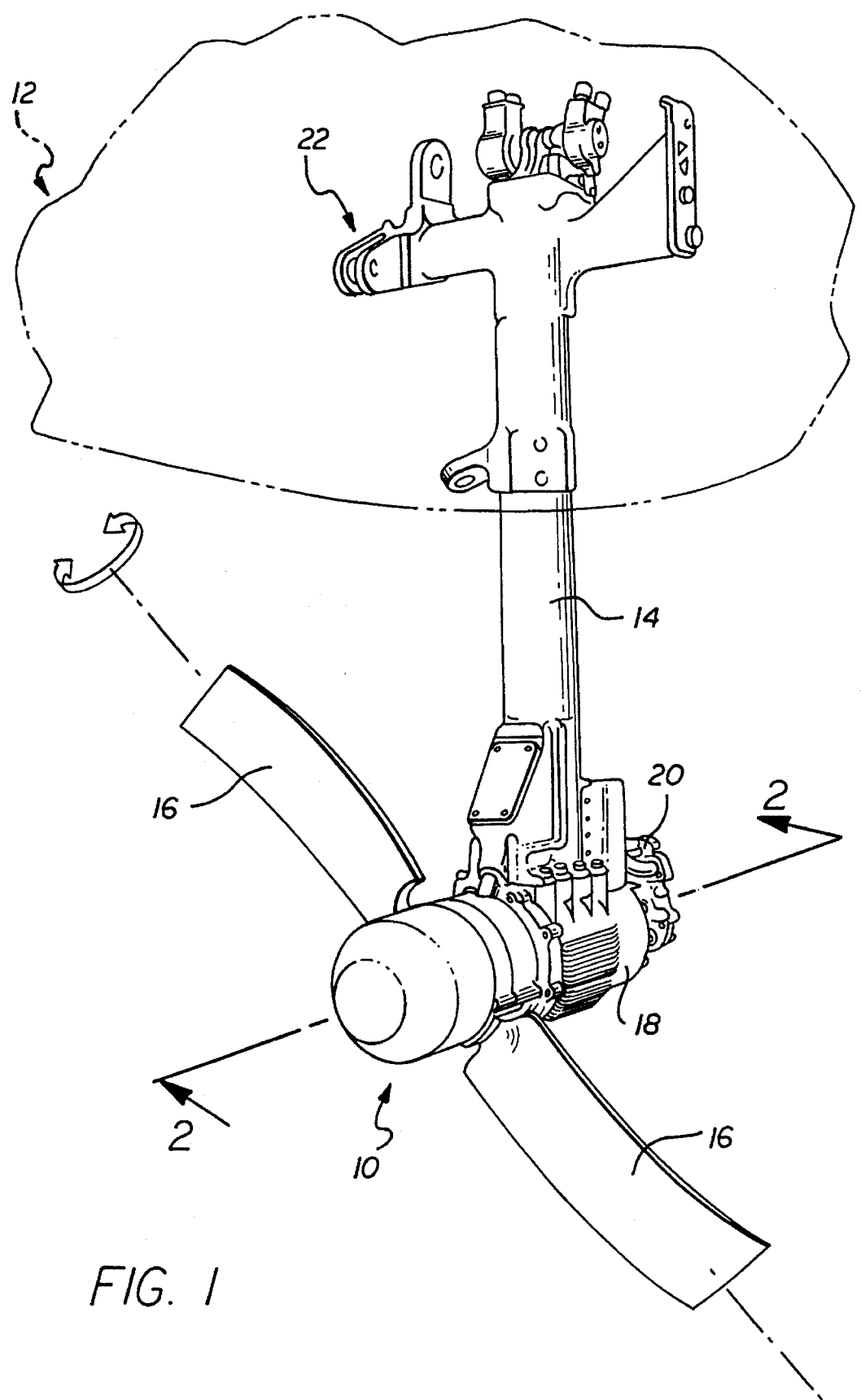
FIG. 1 is a perspective view illustrating a ram air turbine embodying the novel features of the invention.

As shown in the exemplary drawings, a ram air turbine referred to generally by the reference numeral 10 is provided for driving one or more auxiliary power systems in an aircraft 12. As shown in FIG. 1, the ram air turbine 10 is suspended from the aircraft 12 by means of a strut 14 and includes a pair of turbine blades 16 which are rotatably driven by the surrounding air stream to correspondingly drive an electrical generator 18 and/or an hydraulic pump 20. The turbine 10 includes speed control means for adjusting the pitch angle of the turbine blades 16 in a manner to achieve rapid turbine acceleration to substantially full-speed rotation, when the turbine 10 is deployed. Thereafter, the speed control means maintains a substantially constant turbine speed despite variations in air speed and/or turbine load.

The ram air turbine 10 is normally stored within a suitable compartment in the fuselage or wing of the aircraft 12. In the event of a primary power system failure, the ram air turbine 10 is designed to be deployed quickly and easily by pivoting the strut 14 relative to a mounting assembly 22, thereby moving the ram air turbine 10 to an exposed position within the air stream flowing past the aircraft. In general terms, the turbine blades 16 are rotatably driven by the air stream, whereby a turbine output shaft 24 (FIG. 2) provides a rotary output for driving the auxiliary power unit, such as the electrical generator 18 and/or the hydraulic pump 20. FIG. 1 illustrates these auxiliary power units arranged in an in-line configuration with the ram air turbine 10.

A primary governor 26 (FIG. 2) is provided as part of the ram air turbine 10 for adjusting the pitch angle of the turbine blades 16 within a selected range of adjustment, for the purpose of maintaining the rotational speed of the output shaft 24 substantially constant despite variations in air speed and/or the electrical or hydraulic load applied to the turbine. In this regard, blade pitch angle adjustment for maintaining a substantially constant turbine rotational speed is known in the art, in order to achieve optimum efficiency of operation for the auxiliary power unit or units.

In addition to the primary governor 26, the improved ram air turbine 10 of the present invention includes a secondary governor 28 for controlling turbine blade pitch angle upon initial deployment of the ram air turbine. More specifically, prior to deployment, the ram air turbine 10 is in an at-rest condition with a turbine rotational speed of zero. When the turbine 10 is deployed within the air stream, the secondary governor 28 controls turbine blade pitch angle during an initial acceleration phase, in order to achieve a rapid and substantially optimized turbine acceleration from zero speed to the desired full-speed rotation. To achieve this goal, the secondary governor initially preloads the turbine blades to a selected midrange pitch angle at the at-rest condition, wherein the midrange pitch angle is chosen for fast and substantially optimized turbine acceleration on initial deployment. When the turbine rotational speed reaches a selected speed, the secondary governor 28 is effectively disabled to permit subsequent speed control in response to operation of the primary governor 26.

With reference to FIGS. 2–6, the turbine output shaft 24 is rotatably supported by a bearing 30 at the front or nose end of the generator 18. The output shaft 24 protrudes forwardly from the generator 18 and carries a rotary hub 32 within which the primary and secondary governors 26 and 28 are contained. Within the hub 32, the output shaft 24 is coupled by a rotary gear coupling 34 and thrust bearings 36 with the outwardly radiating turbine blades 16. The rotary gear coupling 34 accommodates turbine blade rotation relative to radial axes 38 (FIG. 5) to adjust blade pitch angle, in a manner known to persons skilled in the art.

The primary governor 26 comprises a pair of centrifugal primary flyweights 40 (FIG. 3) mounted in a symmetric arrangement within the rotary hub 32 near the front or nose end of thereof. These flyweights include outer ends which are pivotally connected by pivot pins 42 disposed within the rotary hub 32 near the hub periphery. The flyweights 40 each have a distal end carrying a cam follower 44 in rolling engagement with a contoured cam surface 46 of a cam lever 48. The cam lever 48 has a central sleeve 50 which is secured by a splined connection onto the turbine output shaft 24 for rotation therewith.

Figure 2:
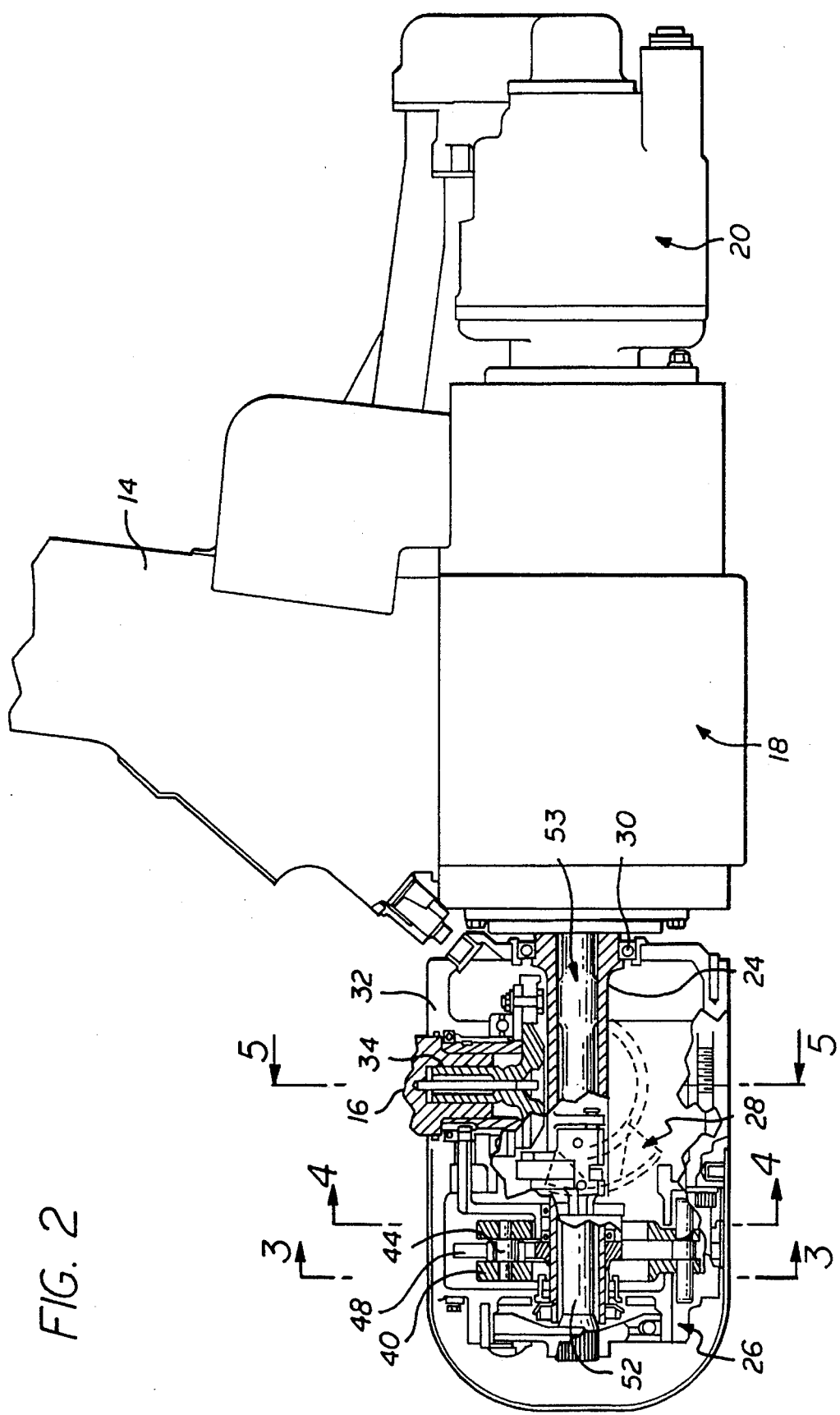
FIG. 2 is a longitudinal sectional view taken generally on the line 2—2 of FIG. 1, with an electrical generator and hydraulic pump being shown in side elevation.
Figure 3:
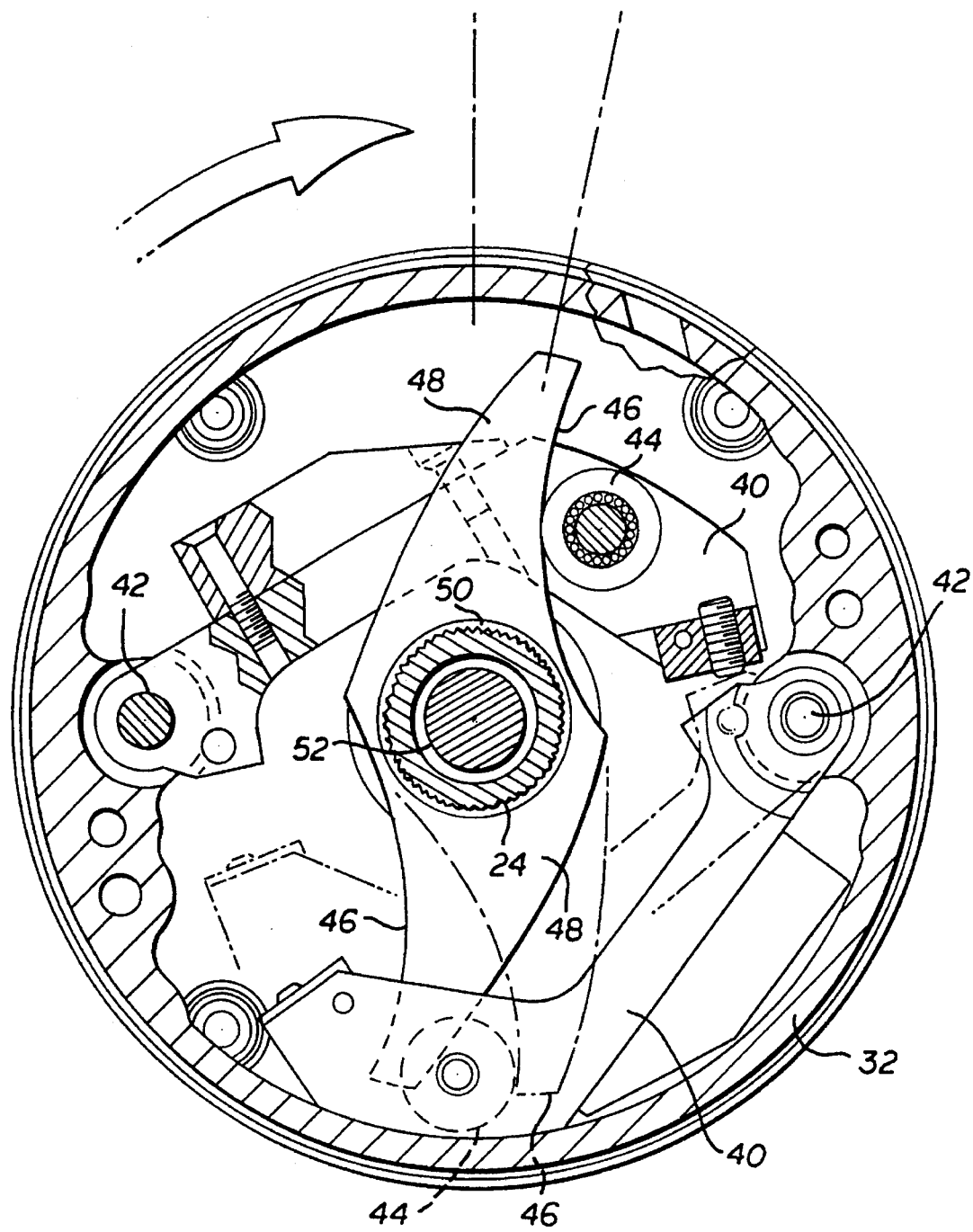
FIG. 3 is an enlarged transverse sectional view taken generally on the line 3—3 of FIG. 2.

The primary flyweights 40, including the pivot pins 42 thereof, are suspended from the free end of a torsion bar 52. The torsion bar 52, as viewed in FIG. 2, is coupled in turn to the output shaft 24 at a location spaced axially from the primary governor 26, as indicated by arrow 53. The torsion bar 52 functions to apply a preload to the flyweights 40 for the purpose of displacing said flyweights toward a radially innermost position.

As the rotational speed of the shaft 24 increases, centrifugal force applied to the flyweights 40 causes those flyweights to displace radially outwardly from the shaft 24. As this radial displacement takes placed the flyweight cam followers 4 engage and rotate the cam lever 48 through a short part-circle increment. The cam lever 48 is connected in turn by the shaft 24 with a face gear 54 (FIGS. 4 and 6) having gear segments 56 meshed with splined collars 58 (FIG. 6) at the base or root ends of the turbine blades 16. Thus, as a function of output shaft rotational speed, the primary governor 26 modulates the position of the face gear 54 to adjust or feather the pitch angle of turbine blades 16, in a manner designed to maintain a substantially constant rotational speed for the output shaft 24. In a preferred form of the invention, the various gear components and the primary governor 26 are designed to achieve a range of pitch angle adjustment from a low or coarse pitch angle of about 6 degrees to a high or fine pitch angle of about 58 degrees. During normal operation, when substantially full speed rotation is achieved, the primary governor 26 typically modulates blade pitch angle near the higher end of the adjustment range to maintain constant rotational output speed.

The provision of the secondary governor 28, in accordance with the present invention, recognizes that optimally rapid turbine acceleration does not occur with an initial pitch angle setting at the low end of the normal adjustment range. Accordingly, the secondary governor 28 preloads the turbine blades 16 to a midrange pitch angle position, on the order of about 16 degrees in a preferred embodiment, when the turbine is in an at-rest condition. This midrange position is selected for faster turbine speed run-up upon initial deployment of the ram air turbine. This midrange pitch angle position is maintained for an initial acceleration phase, upon initial turbine deployment, and the secondary governor 26 is thereafter disabled to enable subsequent control in response to the primary governor 26, as described above.

Figure 4:
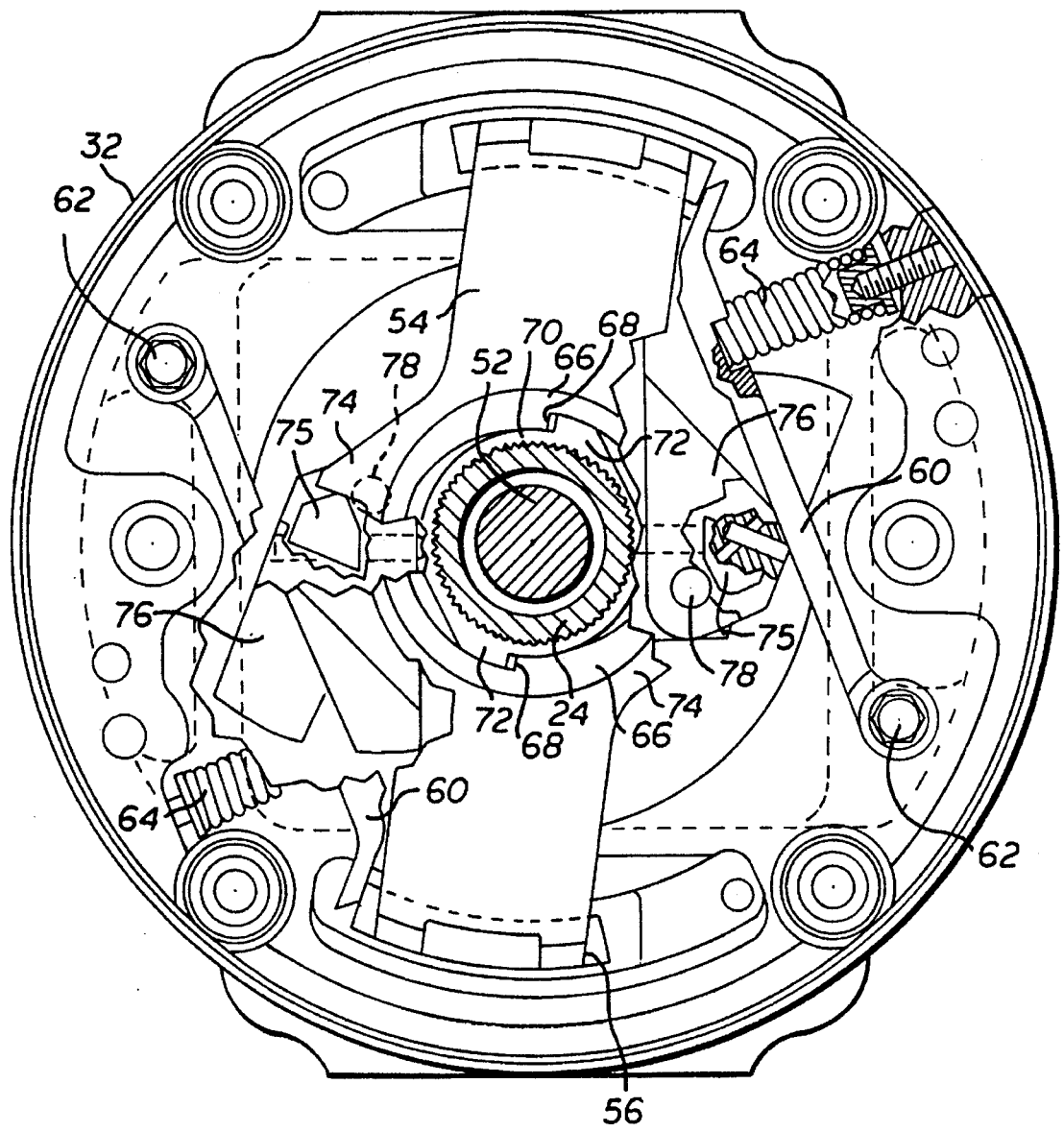
FIG. 4 is an enlarged transverse sectional view taken generally on the line 4-4 of FIG. 2.
Figure 5:
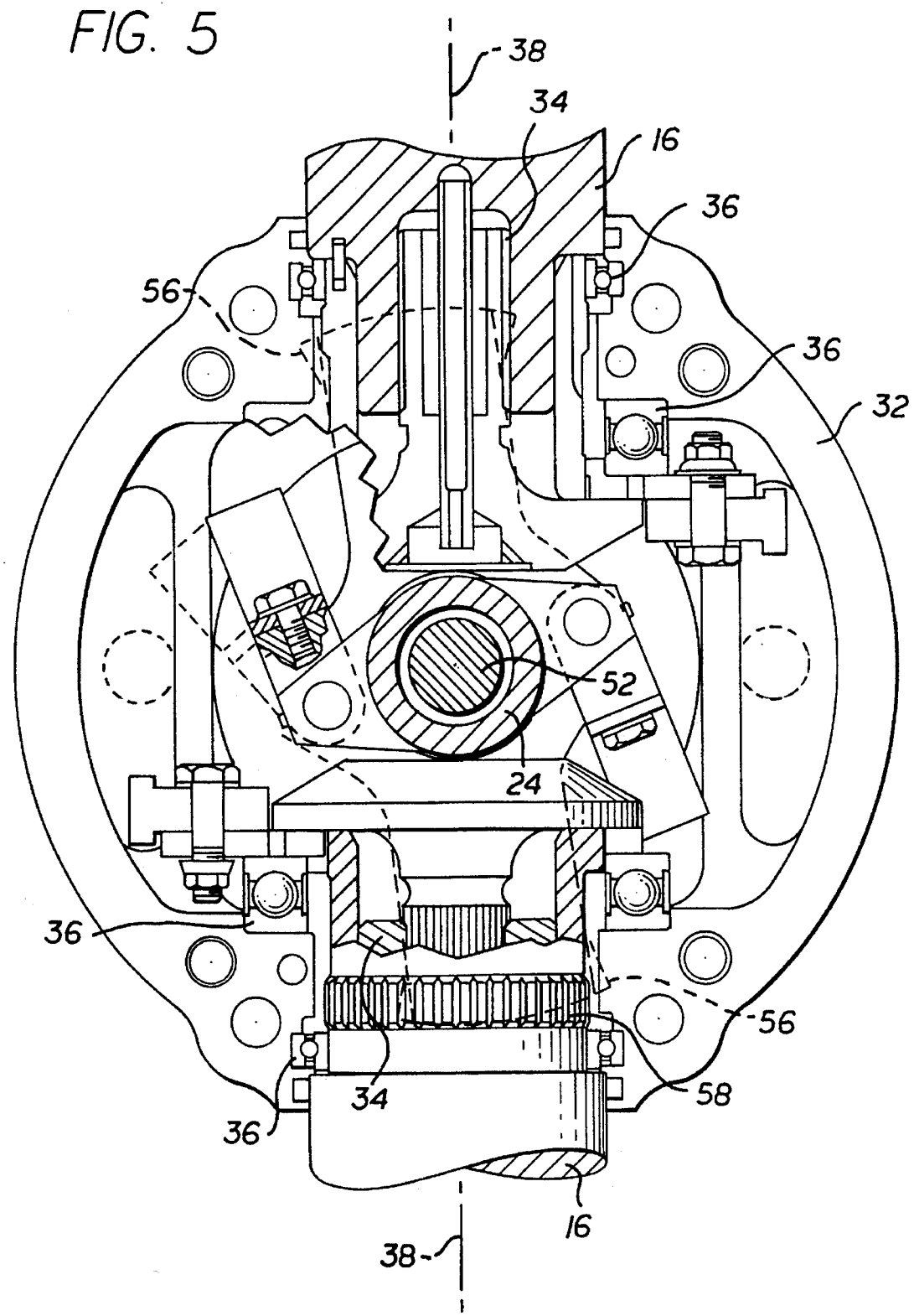
FIG. 5 is an enlarged transverse sectional view taken generally on the line 5-5 of FIG. 2.
Figure 6:
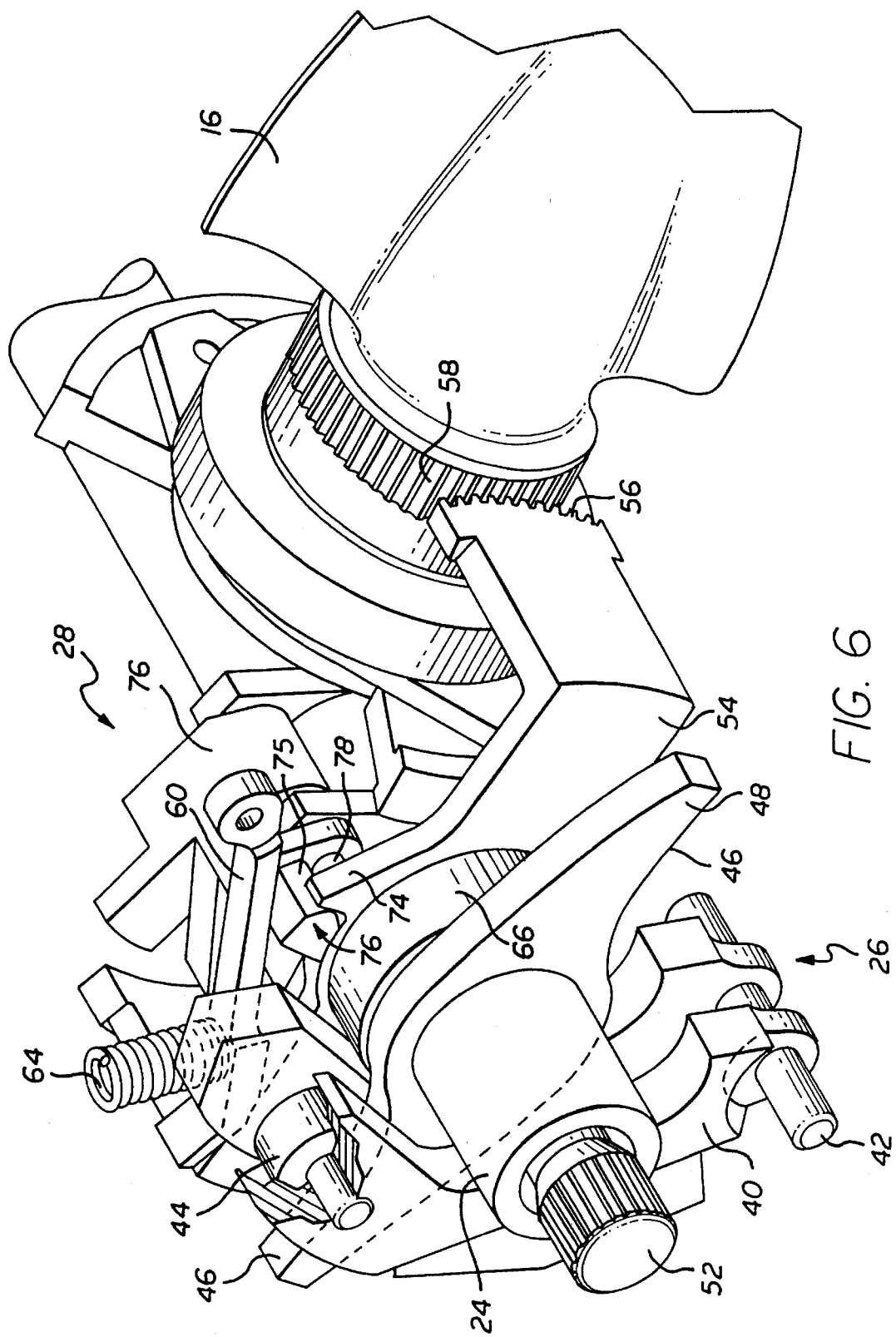
FIG. 6 is a fragmented perspective view, shown somewhat in schematic form, and illustrating the primary governor and secondary governor used in the ram air turbine of FIGS. 1—5.

As shown in FIGS. 4–6, and the secondary governor comprises a pair of preload levers 60 which are also pivotally mounted as by pins 62 within the central hub 32. The preload levers 60 have free ends biased by preload springs 64 for engaging side edges of the face gear 54. The face gear 54 has a central sleeve 66 (FIG. 4) which is unsplined, but defines a pair of radial stops 68. This sleeve 66 is carried about a drive sleeve 70 having a splined connection on the shaft 24 and further defining a pair of radially outwardly protruding lugs 72 for engaging the stops 68 on the face gear. The preload levers 60 are biased by the springs 64 for displacing the at-rest face gear 54 through a short part-circle stroke sufficient to displace the stops 68 away from the associated drive sleeve lugs 72 as viewed in FIG. 4. When this occurs, a pair of radial teeth 74 on the face gear 54 engage cam lugs 75 on a corresponding pair of secondary flyweights 76. The secondary flyweights 76 are pivotally mounted by pins 78 (FIG. 6) onto the shaft 24, and are urged by the preloaded face gear 54 in the at-rest position by engagement of the cam lugs 75 by the teeth 74, toward radially innermost positions bottomed out against the shaft 24. In this position, in accordance with a primary aspect of the invention, the face gear 54 is rotationally displaced sufficiently to adjust the turbine blade pitch angle from the coarse end of the range (about 6 degrees in the preferred form) to a selected midrange pitch angle position, preferably about 16 degrees.

Upon initial rotation of the ram air turbine, when deployed in the air stream, the turbine blades 16 are thus disposed at the midrange pitch angle of about sixteen degrees. This midrange pitch angle has been demonstrated to achieve a substantially faster acceleration of the turbine to operating speed, thereby making the auxiliary power unit or units available for aircraft control and maneuvering with a shorter time delay. When a sufficient rotational speed is reached, such that the centrifugal force applied by the secondary flyweights 76 overcomes the preload springs 64, the secondary flyweights engaging the teeth 74 (by means of the cam lugs 75) effectively shift the face gear 54 back through the incremental part-circle stroke until the radial stops 68 engage the drive sleeve lugs 72. When this occurs, the secondary governor 28 is effectively disabled, and subsequent speed control is obtained by operation of the primary governor 26, as previously described. In one preferred system configuration, the preload springs 64 were selected to provide a preload force, such that the secondary governor 28 was effectively disabled at a turbine speed of about 2000 rpm. Thereafter, upon further turbine acceleration to a higher and normal operating speed, the primary governor adjusts the pitch angle of the blades 16 within the entire adjustment range to maintain the desired substantially constant shaft output speed. Control by the secondary governor 28 does not re-occur until the shaft speed is reduced below the shift point attributable to the secondary flyweights 76.

A variety of further modifications and improvements to the invention described herein will be apparent to those skilled in the art. Accordingly, no limitation on the invention is intended by way of the foregoing description and accompanying drawings, except as set forth in the appended claims.

What is claimed is:

1. A ram air turbine for deployment within an air stream to rotatably drive an output shaft, said ram air turbine comprising:

a rotary hub carried by said output shaft and having at least two turbine blades radiating outwardly therefrom, said turbine blade being supported by said hub to permit adjustment of blade pitch angle;

a primary governor coupled to said turbine blades and including first flyweight means responsive to hub rotation to adjust the blade pitch angle within a range of low to high pitch angles to maintain the rotational speed of said hub and the output shaft at a substantially constant operating speed; and a secondary governor including shift means for shifting said turbine blades to a selected midrange pitch angle when said hub and the output shaft are in an at-rest condition, said midrange pitch angle being selected for faster acceleration of said hub and the output shaft from the at-rest condition on initial deployment, and said secondary governor further including means for disabling said shift means when said hub and the output shaft are accelerated to a selected rotational speed to permit subsequent speed control in response to operation of said primary governor.

2. The ram air turbine of claim 1 wherein said primary governor is mounted within said rotary hub.

3. The ram air turbine of claim 2 wherein said primary governor includes a face gear engaged with said turbine blades to adjust the blade pitch angle within the range of low to high pitch angles, and cam means coupled between said face gear and said first flyweight means for adjusting the blade pitch angle within said range.

4. The ram air turbine of claim 1 wherein said primary governor further includes preload means for biasing said turbine blades toward a pitch angle at the low end of said range.

5. The ram air turbine of claim 3 wherein said shift means of said secondary governor includes preload means for displacing said face gear to shift the blade pitch angle to said selected midrange pitch angle when said hub and output shaft are in the at-rest condition.

6. The ram air turbine of claim 5 wherein said disabling means of said secondary governor comprises second flyweight means responsive to hub rotation for countering said preload means upon acceleration of said hub and the output shaft to said selected rotational speed, said selected rotational speed being less than said substantially constant operating speed.

7. The ram air turbine of claim 6 wherein said preload means comprises at least one preload lever and a spring for urging said preload lever to bear against said face gear with a predetermined force, and further wherein said second flyweight means comprises a flyweight carried for rotation with said hub and positioned to apply a rotational force to said face gear in opposition to said predetermined force applied to said face gear by said preload lever.

8. The ram air turbine of claim 1 wherein said secondary governor is mounted within said rotary hub.

9. A ram air turbine for deployment within an air stream to rotatably drive an output shaft, said ram air turbine comprising:

a rotary hub carried by said output shaft and having at least two turbine blades radiating outwardly therefrom, said turbine blades having a blade root with a splined segment and being mounted on said hub to permit adjustment of blade pitch angle;

a primary governor including a face gear engaged with said blade splined segment of said tubular blades, first flyweight means for moving said face gear in response to hub rotation to adjust blade pitch angle within a range of low to high pitch angles, and first preload means for biasing said face gear toward a position with the blade pitch angle at the low end of said range, said primary governor being responsive to hub rotation to maintain the rotational speed of said hub and the output shaft at a substantially constant operating speed; and a secondary governor including second preload means for moving said face gear when said hub and the output shaft are in an at-rest condition to shift the turbine blades to a selected midrange pitch angle, and second flyweight means responsive to hub rotation for countering and thus disabling said second preload means upon acceleration of said hub and the output shaft from the at-rest condition to a selected rotational speed, said selected rotational speed being less than said substantially constant operating speed.

10. The ram air turbine of claim 9 wherein said primary and secondary governors are mounted within said rotary hub.

11. The ram air turbine of claim 9 wherein said output shaft has a drive sleeve thereon and carried for rotation therewith, said drive sleeve including at least one radially extending lug, and further wherein said face gear has a central sleeve carried about said drive sleeve and defining at least one radially extending stop for engaging said drive sleeve lug, said second preload means applying a force to said face gear to rotate said face gear relative to said drive sleeve to displace said stop rotationally away from said drive sleeve lug, said second flyweight means applying an opposite force to said face gear to rotate said face gear to displace said stop into engagement with said drive sleeve lug upon acceleration of said hub and the output shaft to said selected rotational speed.

12. The ram air turbine of claim 11 wherein said second flyweight means moves radially outwardly in response to increasing rotational speed of said hub, and further including means on said face gear for engaging said second flyweight means to move said second flyweight means radially inwardly when said hub is in the at-rest condition.

13. A method of controlling a ram air turbine for deployment within an air stream to rotatably drive an output shaft, said ram air turbine having a rotary hub carried by the output shaft with at least one turbine blade radiating outwardly from said hub and being mounted to permit adjustment of blade pitch angle, and a primary governor having flyweight means responsive to hub rotation to adjust blade pitch angle within a range of low to high pitch angles to maintain the rotational speed of the hub and output shaft at a substantially constant operating speed, said method comprising the steps of:

shifting the turbine blade with a secondary governor to a selected midrange pitch angle when the hub and output shaft are in an at-rest condition, said midrange pitch angle being selected for faster acceleration of the hub and output shaft from the at-rest condition to a selected rotational speed which is less than the substantially constant operating speed;

disabling the secondary governor when the hub and output shaft are accelerated to the selected rotational speed; and thereafter regulating blade pitch angle with the primary governor.

* * * * *